No. 793,610.

Patented June 27, 1905.

UNITED STATES PATENT OFFICE.

KARL REINKING AND ERICH DEHNEL, OF LUDWIGSHAFEN-ON-THE-RHINE, AND HANS LABHARDT, OF MANNHEIM, GERMANY, ASSIGNORS TO BADISCHE ANILIN & SODA FABRIK, OF LUDWIGSHAFEN-ON-THE-RHINE, GERMANY, A CORPORATION OF BADEN.

DISCHARGING COMPOUND.

SPECIFICATION forming part of Letters Patent No. 793,610, dated June 27, 1905.

Application filed April 4, 1905. Serial No. 253,877.

*To all whom it may concern:*

Be it known that we, KARL REINKING, a subject of the Prince Regent of Brunswick, and ERICH DEHNEL, a subject of the King of Prussia, German Emperor, residing at Ludwigshafen-on-the-Rhine, in the Kingdom of Bavaria, and HANS LABHARDT, a citizen of the Swiss Republic, residing at Mannheim, in the Grand Duchy of Baden, German Empire, have invented new and useful Improvements in Discharging Agents, of which the following is a specification.

Our invention relates to a new chemical compound which is of great value as a reducing agent and is especially useful for the purpose of discharging coloring-matters.

The specification of British Letters Patent No. 5,867 of 1903 describes the production of a compound by allowing formaldehyde and hydrosulfurous acid, or a salt thereof, to act on one another, the compound produced possessing greater stability in the cold than is possessed by the hydrosulfite itself and acting as a discharging agent only at higher temperatures, in particular on steaming. We have discovered that this compound can be separated into two components by various methods—for instance, by fractional crystallization or by fractional precipitation or by extraction with a suitable solvent. One of these components possesses by itself practically no reducing power, whereas the other possesses a considerably greater reducing power per unit mass than the aldehyde-hydrosulfite compound, and we regard this latter component, with the greater reducing power, as a salt of formaldehyde-sulfoxylic acid. The former component, which when separated from the original composition has practically no reducing power, we have found to be identical with the compound produced by the condensation of formaldehyde with a bisulfite. Since the alkali salts of formaldehyde-sulfoxylic acid and of the formaldehyde-bisulfite compound possess practically equal solubilities in water, separation of the two by fractional crystallization from water is very difficult. Other solvents, however, are more suitable—for instance, as sodium formaldehyde sulfoxylate is more soluble in methyl alcohol than is the compound of formaldehyde with sodium bisulfite the two components can be separated by extracting the aldehyde-hydrosulfite compound with methyl alcohol. Another method of effecting the operation is to dissolve the formaldehyde-hydrosulfite compound in water and then to add a suitable quantity of methyl alcohol, by which means it is possible to precipitate the formaldehyde-bisulfite compound while the formaldehyde sulfoxylate remains in solution. As a rule, the sulfoxylic-acid compounds are more soluble than are the bisulfite compounds, and by transforming the alkali salts into salts of other metals it is possible to effect a separation of the two compounds out of a water solution—for instance, the alkaline-earth-metal salts of the bisulfite compound are difficultly soluble in water, whereas those of the formaldehyde-sulfoxylic acid are easily soluble. We have further discovered that the aldehyde-hydrosulfite compound described in the aforementioned specification can by reduction (for instance, by treatment with zinc-dust in acid solution) be converted wholly into the aforesaid formaldehyde sulfoxylate and that the resulting product possesses approximately twice as much reducing power as that of the original quantity of aldehyde-hydrosulfite compound. Further, it is not necessary to produce the formaldehyde hydrosulfite as an intermediate compound, for the aforesaid formaldehyde sulfoxylate can be obtained directly by the reduction of the formaldehyde-bisulfite compound if instead of using only sufficient reducing agent to reduce the bisulfite to hydrosulfite (see the aforesaid specification) a quantity sufficient to reduce the sulfurous-acid group to a sulfoxylic-acid group be employed and if the reduction be carried out while heating.

To obtain the new compound, the solution after the reduction can be treated with sodium carbonate, filtered, to remove the zinc, and then evaporated in a vacuum. The new compound is thus obtained in the form of its sodium salt, which can be purified by dissolving it in water and then precipitating it from this solution by the addition of alcohol.

Our new product in the form of its sodium salt possesses the following properties: It does not at once reduce indigo carmine in the cold. It is soluble in hot absolute methyl alcohol, and upon extraction with this solvent no formaldehyde-bisulfite compound remains undissolved, but only any inorganic impurities which may be present. When freed from inorganic impurities in this way, our new product in dilute aqueous solution gives no precipitate with a little calcium-chlorid or barium-chlorid solution. If our new product in a state of purity be treated with zinc-dust and acetic acid, no increase in its capacity for reducing indigo-carmine solution on heating is brought about, whereas the reducing power of the old formaldehyde-hydrosulfite compound is in this way practically doubled. If our new product contains as impurity a salt, such as sodium sulfite, this may by the reduction with zinc-dust and acetic acid be converted into hydrosulfite, which of course reduces already in the cold, and any additional reducing power possessed by the mixture treated with zinc-dust and acetic acid in the cold would have to be ignored in testing for our new product. Our new product when free from disturbing ingredients requires upon titration in neutral solution four atomic proportions of iodin to each atomic proportion of sulfur present, while the old formaldehyde-hydrosulfite compound when free from disturbing ingredients required upon titration in neutral solution only half the above-mentioned quantity of iodin —that is to say, two atomic proportions to one atomic proportion of sulfur; but we do not desire to restrict our claim to our product when free from disturbing ingredients. Under any conditions that are practically likely to occur our product would require more than three atomic proportions of iodin upon titration, as aforesaid, to each atomic proportion of sulfur present. Our new sodium formaldehyde sulfoxylate is readily soluble in water, possesses great crystallizing power, and melts at a temperature of about 64° centigrade. The crystals, however, on keeping slowly decompose. We ascribe the following formula,

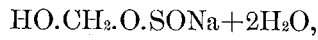

(see *Berichte der Deutschen Chemischen Gesellschaft*, Vol. 38, pages 1048 to 1080,) to our new salt; but we do not limit ourselves to a compound of this formula, since other chemists may have different views as to the constitution.

The following examples will serve to further illustrate the methods according to which we can obtain our new compound; but our invention is not confined to the compounds obtained according to these examples. The parts are by weight.

*Example 1—Separation of the Formaldehyde-Sulfoxylic Compound from the Formaldehyde-Hydrosulfite Compound.*

*A. By extraction.*—Finely powder two hundred (200) parts of formaldehyde sodium hydrosulfite such as can be obtained, for instance, by adding formaldehyde solution to a solution of sodium hydrosulfite until the resulting product no longer reduces indigo carmine in the cold and then evaporating the solution to dryness in a vacuum, or, for instance, the product obtainable by the reaction of formaldehyde on "hydrosulfite pure B. A. S. F.," as described in example 1 of the specification of British Letters Patent No. 5,867, A. D. 1903. Extract this for a few minutes two (2) or three (3) times with methyl alcohol, preferably while warming gently. The residue possesses only to a slight degree the power of reducing indigo in the presence of heat, while the white crystalline solid obtained by evaporating the methyl-alcohol solution in vacuum possesses a greater reducing power than does the original substance.

*B. By crystallization from water and methyl alcohol.*—Finely powder two hundred and eight (208) parts of dry sodium hydrosulfite containing about ninety-six (96) per cent. of $Na_2S_2O_4$ and introduce this rapidly into two hundred (200) parts of formaldehyde solution containing about thirty-six and seven-tenths (36.7) per cent. of $CH_2O$. The heat given out by the reaction favors the solution, and if any of the solid hydrosulfite remains undissolved it can be brought into solution by the addition of a little water. As soon as all the solid hydrosulfite has disappeared filter and then add methyl alcohol to the hot solution while stirring until slight turbidity is observed. On cooling a mass of crystals is obtained possessing practically no reducing power unless too much alcohol has been added. When the separation of the crystals is finished, filter them off and evaporate the filtrate in a vacuum while warming gently. The syrupy residue obtained becomes crystalline on cooling and consists principally of the sodium salt of the said formaldehyde-sulfoxylic acid.

*C. By crystallization from water.*—Allow a concentrated solution of formaldehyde hydrosulfite—such, for example, as that prepared as described under B—to evaporate slowly, preferably at a temperature of from thirty-five to forty degrees centigrade (35° to 40° C.) and filter off from time to time the crystals which separate out. The fractions finally obtained contain about eighty-eight (88) per cent. of formaldehyde sulfoxylate, and by recrystallizing this the compound can be obtained in the pure form.

*Example 2—Reduction of the Formaldehyde-Hydrosulfite Compound.*

Dissolve two hundred and ten (210) parts of dry sodium hydrosulfite such as can be obtained as described in the specification of British Letters Patent No. 7,397, A. D. 1904, in one hundred and ninety (190) parts of formaldehyde solution containing about forty (40) per cent. of $CH_2O$, add eighty-five (85) parts of zinc-dust, which has previously been wetted, and then add the necessary amount of acetic acid—for example, about one hundred (100) parts. Warm and boil until the reducing power of the solution no longer increases. This can be tested for by its power of reducing hot indigo-carmine solution or ammoniacal-copper-oxid solution. The time required is generally about ten (10) minutes. Precipitate the zinc from the solution by means of sodium carbonate, filter, and evaporate the filtrate in vacuum. A crystalline mass is thus obtained which consists of the sodium salt of the said formaldehyde-sulfoxylic acid mixed with sodium acetate.

*Example 3—Preparation of a New Reducing Compound from Sodium Bisulfite and Formaldehyde.*

A. *With zinc.*—Mix together one hundred (100) parts of sodium bisulfite solution containing about forty-two (42) per cent. of $NaHSO_3$ and thirty (30) parts of formaldehyde solution containing about forty (40) per cent. of $CH_2O$ and heat the mixture to a temperature just below its boiling-point. Now add alternately small quantities of acetic acid containing fifty (50) per cent. of $C_2H_4O_2$ and zinc-dust until fifty (50) parts of acetic acid and thirty-two (32) parts of zinc-dust have been added. After the addition is complete add concentrated sodium-carbonate solution till the mixture is weakly alkaline, boil for a few minutes, filter, and evaporate the filtrate in vacuum. There remains behind a thick syrup containing the sodium salt of formaldehyde-sulfoxylic acid mixed with sodium acetate. On cooling the syrup solidifies to a crystalline mass.

B. *With iron.*—Boil three hundred and twenty (320) parts of a formaldehyde-bisulfite solution obtained from two hundred and forty-six (246) parts of sodium-bisulfite solution containing about forty-two (42) per cent. $NaHSO_3$ and seventy-four (74) parts of a forty (40) per cent. formaldehyde solution with seventy-five (75) parts of thin iron shavings and then add gradually during a period of from twenty (20) to thirty (30) minutes two hundred (200) parts of fifty (50) per cent. acetic acid. During the reaction hydrogen and some sulfureted hydrogen are evolved, and also toward the end of the reaction the smell of mercaptan is recognizable. Filter the resulting solution, precipitate the iron by means of sodium carbonate, filter again, and evaporate the solution in vacuum to obtain the reduction product. The reaction proceeds in a similar manner if, instead of the above-mentioned quantity of iron, twenty (20) parts of aluminium powder be employed. The reduction can also be effected by the use of stannous chlorid as reducing agent.

Now what we claim is—

A new discharging compound formaldehyde sulfoxylate which in the form of its sodium salt possesses great crystallizable power, is readily soluble in water and melts at a temperature of about 64° centigrade, which is soluble in hot absolute methyl alcohol and contains no formaldehyde-bisulfite compound, and which reduces indigo carmine upon heating, which capacity is not increased by treatment with zinc-dust and acetic acid, and which compound upon titration in neutral solution with iodin requires more than three atomic proportions of iodin to each atomic proportion of sulfur present.

In testimony whereof we have hereunto set our hands in the presence of two subscribing witnesses.

KARL REINKING.
ERICH DEHNEL.
HANS LABHARDT.

Witnesses:
ERNEST F. EHRHARDT,
J. ALEC. LLOYD.